Sept. 13, 1932.  O. F. CARLSON  1,876,568
STEERING MECHANISM
Filed Sept. 27, 1929
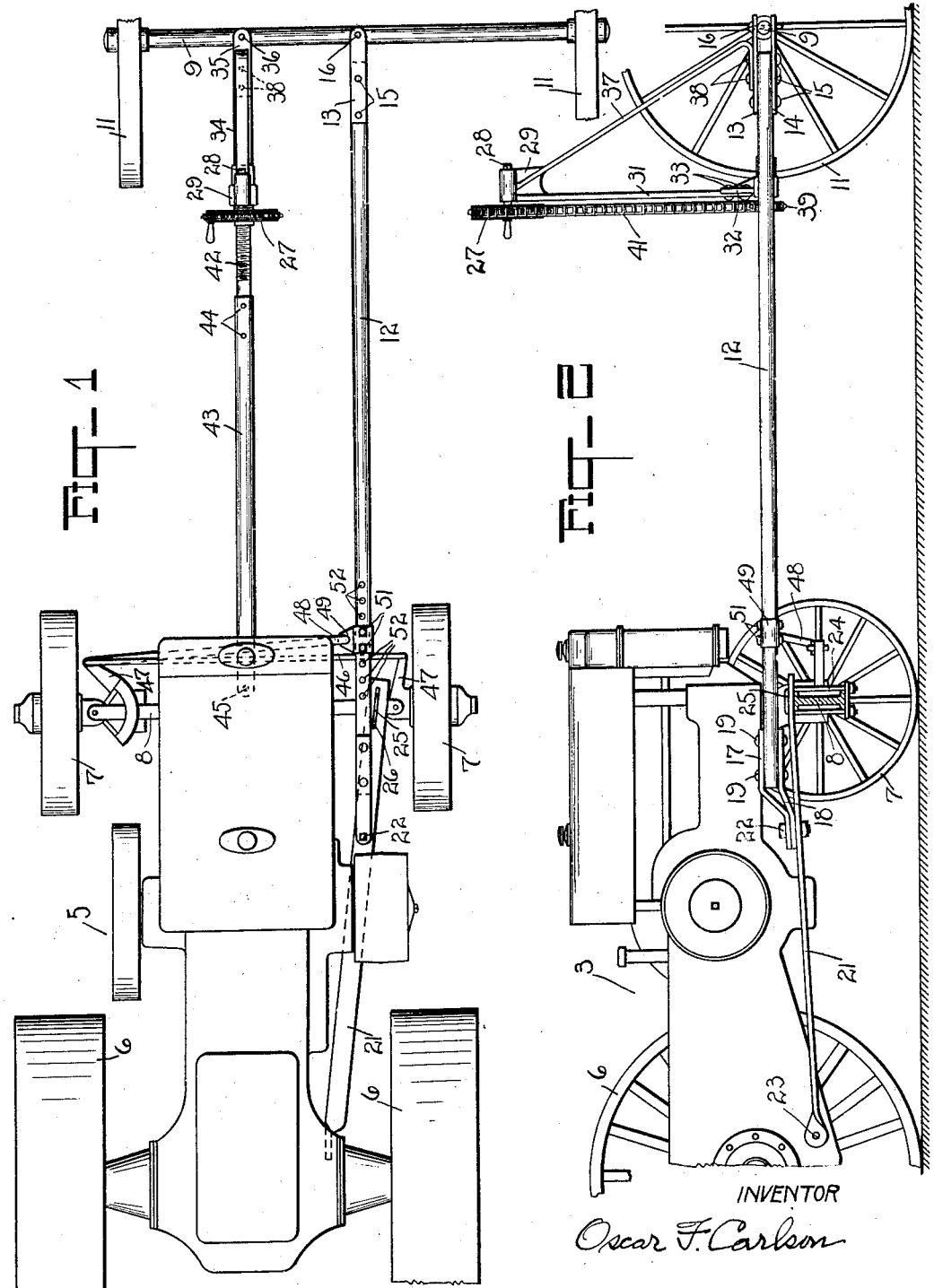
INVENTOR
Oscar F. Carlson
BY Brown, Jackson, Boettcher & Dienner
ATTORNEYS
WITNESS
A. D. McLeay Patented Sept. 13, 1932

1,876,568

UNITED STATES PATENT OFFICE

OSCAR F. CARLSON, OF MOLINE, ILLINOIS, ASSIGNOR TO DEERE & COMPANY, OF MOLINE, ILLINOIS, A CORPORATION OF ILLINOIS

STEERING MECHANISM

Application filed September 27, 1929. Serial No. 395,538.

The present invention relates to means for connecting an implement forward of a tractor so that the same may be pushed by the tractor, and whereby the implement and the tractor may be simultaneously steered by a single steering means, so that the front wheels of the tractor are automatically steered in correct differential relationship with respect to the implement being pushed, and this irrespective of the size of the turning arc. One of the objects of the invention is to provide means for pivotally connecting the implement to the tractor so that it may displace itself angularly with respect to the tractor when said implement is steered. Another object of the invention is the provision of means by which the steering of the tractor is controlled by the angular displacement between the implement and the tractor. A still further object is the provision of means for longitudinally adjusting the pivotal connection between the implement and the tractor whereby the amount of angular displacement between the implement and the tractor which takes place for any given turning arc may be changed within certain predetermined points.

In the drawing,

Fig. 1 is a plan view showing diagrammatically part of the frame of an implement connected to the front end of a tractor in accordance with the present invention; and Fig. 2 is a side elevation of the arrangement shown in Fig. 1, the right hand wheels of the tractor and of the implement being omitted and the front axle of the tractor being shown in section.

Referring to these figures,—5 indicates the tractor as a whole, which is supported on rear traction wheels 6 and front steering wheels 7, the latter having swiveled mounting on the ends of a transversely extending axle 8, as usual. 9 indicates the axle of an implement preferably of a two wheeled type which supports the side wheels 11. Such implement may comprise soil working or cultivating tools, crop cutting or gathering devices, or may be in the nature of a load carrying vehicle.

The implement is connected to the front end of the tractor so as to be pushed thereby by means of a push bar 12, the forward end of which is secured between spaced plates 13, 14 by rivets 15, said plates extending forwardly therefrom and embracing the axle 9, as diagrammatically shown in Fig. 2, and being pivotally connected to said axle by a pivot pin 16 so as to be capable of swinging laterally relatively to said axle. The rear end of the push bar 12 is bolted between spaced plates or brackets 17, 18 by rivets 19, which plates extend rearwardly therefrom and converge toward each other, as shown in Fig. 2.

The plates 17, 18, are pivoted to a longitudinally extending brace bar 21 on the tractor by means of a bolt 22, as shown. The rear end of said brace bar 21 is suitably secured to the tractor frame at 23, and the forward end thereof rests on the top of the front axle 8 of the tractor, on which it is adjustably held by a U-shaped bolt 24, the upper portion 25 of which projects through a slot 26 in the brace bar 21, see Fig. 1. This attachment permits the front end of the brace bar 21 to be adjusted transversely of the tractor along the top of the axle 8.

The steering of the implement is controlled by a hand operated steering wheel 27 mounted on a shaft 28, suitably journaled in a bracket 29 which as shown is formed integral with the upper end of a supporting standard 31, the lower end of which is secured to a bracket 32 by rivets or bolts 33. The bracket 32 is suitably secured to and extends upwardly from a tubular rod 34, the forward end of which is suitably secured between spaced plates 35, which extend forwardly therefrom and have their ends spaced above and below the axle 9 of the implement at a point intermediate the left hand wheel 11 and the pivotal connection 16 of the push bar 12, see Fig. 1, said plates being pivotally connected with said axle, so as to be capable of swinging laterally thereof, by a pivot pin 36. The bracket 29 is also supported and braced by a brace bar 37 secured at its upper end to said bracket and having its lower end suitably secured to the upper plate 35, as by rivets 38, see Fig. 2.

Rotatably supported at the rear end of said tubular rod 34 is a sprocket wheel 39, which is operatively connected with the steering wheel 27 by a chain 41 so that rotation of said steering wheel will rotate said sprocket wheel 39. The hub of the sprocket wheel 39 is held against shifting endwise on the hollow supporting rod 34 and is provided with an internally threaded bore into which screws the forward threaded end 42 of a rod 43, for a purpose hereinafter described. While in the drawing I have shown the rod 43 and the screw threaded forward end 42 thereof as formed of two separate pieces suitably secured together by the pins or rivets 44, it should be understood that if desired these parts may be formed integral. The rear end of the rod 43 is suitably pivoted to the tractor at 45 so as to be able to swing laterally thereof. It should be noted that in the construction shown and described the rod 43 also functions as a brace between the implement and the tractor, which is particularly important if the load on the implement should become unbalanced.

It will be understood from the foregoing description that by operating the steering wheel 27 the sprocket wheel 39 will be rotated in one direction or the other as desired, and the forward threaded end 42 of the rod 43 will be moved into or out of the internally threaded bore of the sprocket wheel 39, thereby lengthening or shortening the distance between the pivot connections 36 and 45, as the case may be, to steer the implement in one direction or the other.

The front steering wheels 7 of the tractor are connected together in the usual manner by a drag link 46, see Fig. 1, by the swinging of which drag link both wheels are steered. The opposite ends of the drag link 46 are each pivotally connected with arms 47 extending from the steering knuckles of the wheel 7. In the present arrangement, the steering of said wheels is effected by a link 48 which is pivotally connected at one end to the left hand arm 47 as shown in Fig. 1, the other end of said link being pivotally connected to a bracket 49 which embraces the push bar 12 and is held fixed thereto by means of a pair of bolts 51 which pass through adjacent holes 52 provided in said push bar. As shown in said figure, the push bar 12 is provided with a plurality of the holes 52 spaced apart longitudinally therealong so that the position of the bracket 49 on the push bar 12 may be adjusted to any one of several positions by placing the bolts 51 through any adjacent pair of the longitudinally spaced holes in said push bar, as will be readily appreciated.

The operation of the device is as follows. Taking for example the position of the implement and the tractor shown in the drawing, in which they are in a position for straight forward movement, let us assume now that the operator, before starting the tractor, rotates the steering wheel 27 in a direction to extend the rod 43, thereby causing the left hand side of the axle 9 of the implement to swing forwardly the requisite amount to swing the wheels 11 of the implement the desired amount, thereby changing the angular position of the axle 9 with respect to the push bar 12. The operator now starts the tractor.

In the first forward movement, the implement will commence to change its course from such straight line position with respect to the tractor, moving off to the right, and by reason of the link connection 48 with the push bar 12 through the bracket 49 said link 48 will through its connections with the steering wheels 7 of the tractor steer said wheels in the proper direction. The implement, however, will continue to displace itself angularly with respect to the tractor until the front wheels of the tractor have been turned to a point where they have a common turning arc with the wheels 11 of the implement. From then on the tractor and the implement will remain in fixed relation with respect to each other and turn about a common center. For returning to a straight line of travel or for steering in the opposite direction the steering wheel 27 is oppositely rotated to shorten the effective length of the rod 43 and change the angle of the axle 9 relatively to the tractor. As the implement starts to travel to the left it swings the push bar 12 to the left and deflects the tractor wheels 7 correspondingly until the tractor and implement are traveling in a straight line or until the wheels 7 and 11 are traveling in a common turning arc.

It will be observed that in all of these steering angles the front wheels of the tractor are automatically steered in correct differential relationship with respect to the implement being pushed, and this irrespective of the size of the turning arc. Such is an important feature of the invention. Another important feature is the adjustment of the bracket 49 along the push rod 12, determined by the placing of the bolts 51 in different pairs of the holes 52. By this adjustment the amount of angular placement between the implement and the tractor which takes place for any given turning arc may be changed.

When the bracket 49 is positioned close to the pivot point 22, a much less angular displacement is necessary to turn the front wheels of the tractor the required amount. By this means the connection may be adjusted to suit soil conditions in which the tractor and the implement are to be operated. The greater the angle that can be permitted between the implement and the tractor, the sharper the turn that can be executed. However, the maximum angle permissible is limited to the angle at which slippage of the front tractor wheels will occur, which varies with ground conditions. The angle between the implement and the tractor should ordinarily not be permitted to go beyond the point where the front wheels of the tractor will slip. The transverse adjustability of the front end of the brace bar 21 along the axle 8 also enables the angular rotation between the front tractor wheels and the implement wheels to be adjusted.

In the embodiment illustrated in the drawing the bracket 49 is shown as being connected with the push rod 12 but such bracket might be mounted on the extensible steering control rod 43, transmitting the lateral deflecting movement of said rod 43 to the link 48 in the same manner.

It should also be noted that the positions of the pivot points 22 and 45 are more or less arbitrary, the drawing being largely diagrammatic.

The implement is illustrated as being in offset relation with respect to the tractor. The invention, however, is also applicable to a construction in which the implement is pushed directly ahead of the tractor, instead of in such offset relation as shown, in which case the push bar 12 would preferably be pivoted directly in the center of the tractor, and the steering rod 43 would be connected with the tractor to one side thereof.

The implement might also be provided with swiveled steering wheels, like automobile wheels, instead of the kind shown and described, without departing from the spirit of my invention, but in such a case the bar 34 would be connected to swing said wheels relatively to the frame or axle member 9 and the connection between the push bar 12 and the implement would be a fixed one instead of a pivotal one, with said push rod suitably braced to hold it in such fixed position.

If the usual steering mechanism between the front tractor wheels 7 and the hand operated steering wheel on the tractor should oppose objectionable resistance to the automatic steering movement of said tractor wheels this steering mechanism can be disconnected. The steering wheel 27 may be disposed adjacent to a seat on the implement and may have various types of operative connections with the internally threaded hub member 39 instead of the chain 41, and may even be arranged for actuation from the tractor.

It is to be understood that my invention is not limited to the manner in which the implement being pushed is steered, since the steering of the implement can be effected in various ways as remarked above, although the steering mechanism shown has certain advantages when used in connection with a two-wheeled implement having a centrally pivoted axle. The invention in its broadest aspect is in the provision of a push bar for pushing an implement in front of a tractor and having connection with the steering wheels of the tractor, with the result that when the implement is steered to one side or the other, the lateral swing of the push bar will steer the tractor. Therefore, my invention is not limited to the specific construction diagrammatically shown, but includes numerous modifications or variations such as may occur to those skilled in the art.

I claim:—

1. The combination of a tractor and an implement disposed forwardly of the tractor, a push bar for connecting the implement with the tractor so as to be pushed by the tractor, means for causing lateral angular displacement between the implement and the tractor, and means controlled by lateral swinging of said push bar relative to said tractor for steering the tractor, said means comprising a link operatively connecting the front wheels of the tractor with said push bar.

2. The combination of a tractor and an implement disposed forwardly of the tractor, a push bar connecting the implement with the tractor so as to be pushed by the tractor, a rod connected with the tractor and with the implement remote from said push bar and comprising means adjacent the implement for causing lateral angular displacement between the implement and said push bar, and means controlled by such lateral displacement for steering the tractor.

3. The combination of a tractor and an implement disposed forwardly of the tractor, a push bar connecting the implement with the tractor so as to be pushed by the tractor, means pivotally connected with the tractor and with the implement for causing lateral angular displacement between the implement and the tractor, and means controlled by such lateral displacement, through said push bar, for steering the tractor, said means comprising a link pivotally connecting the push bar and the front wheels of the tractor.

4. The combination of a tractor and an implement disposed forwardly of the tractor, a push bar connecting the implement with the tractor so as to be pushed by the tractor, means connecting the steering wheels of the tractor with an intermediate portion of said push bar, and means for causing lateral angular displacement between the implement and said push bar for steering said tractor through said first-mentioned means.

5. The combination of a tractor and an implement disposed forwardly of the tractor, a push bar connecting the implement with the tractor so as to be pushed by the tractor, means connecting said push bar with the steering wheels of the tractor, a rod remote from said push bar pivotally connecting the tractor with the implement, and means remote from the tractor for adjusting the length of said rod for causing lateral angular displacement between the implement and said push bar for steering said steering wheels through said first mentioned means.

6. The combination of a tractor and an implement disposed forwardly of the tractor and adapted to be pushed thereby, a push bar pivotally connected with said tractor and connected with said implement, means for causing lateral angular displacement between the implement and the tractor, a link connecting said push bar with the steering wheels of the tractor so as to steer the same, and means for longitudinally adjusting said link along said push bar for varying the amount of angular displacement between the implement and the tractor.

7. The combination of a tractor and an implement disposed forwardly of the tractor and adapted to be pushed thereby, means for causing lateral angular displacement between the implement and the tractor comprising a rod pivotally connected with the implement and with the tractor and comprising, screw threaded means intermediate the ends thereof for varying the distance between said pivotal connections, and means controlled by such lateral displacement for steering the tractor.

8. The combination of a tractor and an implement disposed forwardly of the tractor and adapted to be pushed thereby, a push bar pivotally connected with the implement and with the tractor, means connected with the tractor and with the implement and operative to vary the angular displacement laterally of the implement relative to said push bar, and a bracket mounted on said push bar and connected with the steering wheels of the tractor, said bracket being adjustable longitudinally along said push bar for varying the lateral angular displacement between said push bar and the tractor.

9. The combination of a tractor and an implement disposed forwardly of the tractor and adapted to be pushed thereby, a push bar pivotally connected with the implement and with the tractor, a rod pivotally connected with the implement and directly with the forward end of the tractor, said rod being spaced laterally from said push bar, means mounted on said rod forward of its connection with the tractor for causing angular displacement between the implement and said push bar, and means controlled by such lateral displacement for steering the tractor.

10. The combination of a tractor and an implement disposed forwardly of the tractor and adapted to be pushed thereby, a push bar pivotally connected with the implement and with the tractor, a rod pivotally connected at its opposite ends with the implement and directly with the forward end of the tractor, said rod being positioned parallel with said push bar and laterally spaced therefrom, means mounted on said rod between the ends thereof for causing lateral angular displacement between the implement and said push bar, and means controlled by such lateral displacement for steering the tractor.

11. The combination of a tractor and an implement disposed forwardly of the tractor and adapted to be pushed thereby, a push bar pivotally connected with the tractor and with the implement, means mounted on the implement for causing lateral angular displacement between the implement and said push bar, and means controlled by such lateral displacement, through said push bar, for steering the tractor, said means comprising a link pivotally connected at one end to the steering arm of the front wheels of the tractor and at its other end to said push bar.

12. The combination of a tractor and an implement disposed forwardly of the tractor and adapted to be pushed thereby, a push bar pivotally connected with the tractor and with the implement, and means for steering the tractor from the implement, comprising means mounted on the implement remote from said push bar for causing lateral angular displacement between the implement and said push bar, and means connecting said push bar with the steering wheels of the tractor and controlled by such lateral angular displacement between the implement and the push bar.

13. The combination of a tractor and an implement disposed forwardly of the tractor and adapted to be pushed thereby, means mounted on the implement for steering the same, and means pivotally connected with the implement and with the tractor for automatically steering the tractor in correct differential relationship with respect to the implement, said means comprising a push bar pivotally connected with the tractor and with the implement, and a link connecting an intermediate portion of said push bar with the steering wheels of the tractor.

14. The combination of a tractor and an implement disposed forwardly of the tractor and adapted to be pushed thereby, means mounted on the implement for steering the same, means pivotally connected with the implement and with the tractor for automatically steering the tractor in correct differential relationship with respect to the implement, said means comprising a push bar pivotally connected with the tractor and with the implement, and a link connecting said push bar with the steering wheels of the tractor, said link being adjustable longitudinally of said push bar to vary the lateral displacement between the push bar and the tractor.

15. The combination of a tractor and an implement disposed forwardly of the tractor and adapted to be pushed thereby, means for causing lateral angular displacement between the implement and the tractor, said means comprising a rod pivotally connected with the implement and with the tractor, means for varying the length of said rod, and a push bar spaced from said rod and pivotally connected with the implement and with the tractor, and means for automatically steering the steering wheels of the tractor in correct differential relationship with respect to the implement being pushed comprising a link connected with said push bar and with said steering wheels, said link being adjustable longitudinally along said push bar for varying the amount of angular displacement between the implement and the tractor.

16. The combination of a tractor and a wheeled implement disposed forwardly of the tractor, a push bar pivotally connected with the tractor, at a point spaced from the steering axis of the tractor steering wheels, and with the implement, means reacting against the forward portion of the tractor and directly against the implement for causing angular displacement of the implement relatively to said tractor, and means controlled by lateral displacement of said push bar for steering the tractor.

17. The combination of a tractor and an implement disposed forwardly of the tractor and adapted to be pushed thereby, a push bar pivotally connected with the tractor and with the implement, and means for steering the tractor from the implement, comprising means mounted on the implement remote from said push bar and reacting directly against the tractor for causing lateral angular displacement between the tractor and said push bar, and means connecting said push bar with the steering wheels of the tractor and controlled by such lateral angular displacement between the tractor and the push bar for steering the tractor.

18. The combination of a tractor and an implement disposed forwardly of the tractor, a push bar connecting the implement with the tractor so as to be pushed by the tractor, a rod connected at its rear end with the front portion of the tractor at a point spaced laterally from said push bar and at its forward end with the implement and comprising means operable from the implement for causing lateral angular displacement between the implement and said push bar, and means controlled by such lateral displacement for steering the tractor.

19. The combination of a tractor and a wheeled implement disposed forwardly of the tractor, a push bar connecting the implement with the tractor so as to be pushed by the tractor, means for steering the implement to cause lateral displacement of the push bar relatively to said tractor whereby the tractor may be steered by steering the implement, and adjustable connections between the push bar and the steering wheels of the tractor for varying the angular displacement between the implement and the tractor for any given turning arc.

20. The combination of a tractor and an implement disposed forwardly of the tractor, a push bar for connecting the implement with the tractor so as to be pushed by the tractor, means for causing lateral angular displacement between the implement and the tractor, and means controlled by lateral swinging of said push bar relative to said tractor for steering the tractor, said means comprising a flexible connection operatively connecting the front wheels of the tractor with said push bar.

21. A tractor comprising a body portion, rear traction and front steering wheels, an implement disposed forwardly of the tractor, a push bar connected with the implement and pivotally connected with the body of the tractor, means for causing lateral angular displacement between the implement and the tractor, and a connection between said push bar and the front steering wheels for causing steering movement of the latter responsive to angular displacement of the implement with respect to the tractor.

22. A tractor comprising a body portion, rear traction and front steering wheels, an implement disposed forwardly of the tractor, a push bar connected with the implement and pivotally connected with the body of the tractor, means on the implement for causing lateral angular displacement between the implement and the tractor, and a connection between said push bar and the front steering wheels for causing steering movement of the latter responsive to angular displacement of the implement with respect to the tractor.

23. The combination of a tractor and an implement disposed forwardly of the tractor, a push bar connecting the implement with the tractor so as to be pushed by the tractor, means connecting the steering wheels of the tractor with an intermediate portion of said push bar, and means for causing angular displacement between the implement and the tractor for steering said tractor through said first mentioned means.

In witness whereof I hereunto subscribe my name this 13th day of September 1929.

OSCAR F. CARLSON.